(12) United States Patent
Wilson et al.

(10) Patent No.: US 8,585,319 B2
(45) Date of Patent: Nov. 19, 2013

(54) METHANE VENTING SYSTEM

(75) Inventors: Steven Wilson, Reading (GB); Paul Culleton, Warrington (GB)

(73) Assignee: The Environmental Protection Group Ltd. (GB)

( * ) Notice: Subject to any disclaimer, the term of this patent is extended or adjusted under 35 U.S.C. 154(b) by 174 days.

(21) Appl. No.: 13/126,594

(22) PCT Filed: Oct. 28, 2009

(86) PCT No.: PCT/GB2009/002566
§ 371 (c)(1),
(2), (4) Date: Sep. 9, 2011

(87) PCT Pub. No.: WO2010/049685
PCT Pub. Date: May 6, 2010

(65) Prior Publication Data
US 2011/0311406 A1 Dec. 22, 2011

(30) Foreign Application Priority Data
Oct. 28, 2008 (GB) .................................. 0819778.2

(51) Int. Cl.
*B01D 53/85* (2006.01)
(52) U.S. Cl.
USPC .......................................... 405/43; 405/128.5
(58) Field of Classification Search
USPC ............................ 405/36, 43, 128.5; 52/169.5
See application file for complete search history.

(56) References Cited

U.S. PATENT DOCUMENTS

| | | | |
|---|---|---|---|
| 3,038,396 A * | 6/1962 | Jameson, Jr. et al. ........... | 405/43 |
| 3,385,196 A * | 5/1968 | Messen-Jaschin ............ | 454/337 |
| 4,874,133 A * | 10/1989 | Gethke et al. ................... | 405/43 |
| 5,003,750 A * | 4/1991 | Delgado .......................... | 405/43 |
| 5,107,642 A * | 4/1992 | Mogstad ....................... | 52/169.5 |
| 5,643,795 A * | 7/1997 | Hirate et al. ............... | 435/299.1 |
| 5,656,494 A * | 8/1997 | Kant et al. ................. | 435/294.1 |
| 6,065,901 A * | 5/2000 | Stevens et al. .................. | 405/52 |
| 6,255,102 B1 | 7/2001 | Hallsten | |
| 7,422,895 B1 * | 9/2008 | Hallsten ..................... | 435/299.1 |
| 2001/0053546 A1 | 12/2001 | Stewart et al. | |

FOREIGN PATENT DOCUMENTS

| | | |
|---|---|---|
| CH | 679644 | 3/1992 |
| DE | 202005000382 | 3/2005 |
| DE | 102006043538 | 3/2008 |
| EP | 0884117 | 12/1998 |
| GB | 2293851 | 4/1996 |
| GB | 2299580 | 10/1996 |
| JP | 5329323 | 12/1993 |
| WO | WO2001/17701 | 3/2001 |

OTHER PUBLICATIONS

PCT International Search Report, PCT International Application No. PCT/GB2009/002566 dated Feb. 24, 2010.

* cited by examiner

*Primary Examiner* — John Kreck
(74) *Attorney, Agent, or Firm* — McDonnell Boehnen Hulbert & Berghoff

(57) ABSTRACT

A subsoil methane collection and treatment system (10), which includes a subsoil distribution layer (13) for receiving methane, a subsoil biofilter layer (14) above the distribution layer which contains a biofilter (18) such as compost to convert the methane to carbon dioxide and water, a subsoil ventilation layer (15) above the biofilter layer, in which the carbon dioxide is diluted with air, and a vent (17) to the atmosphere from the ventilation area for venting the diluted carbon dioxide. The layers may be defined by horizontal arrays of load bearing prefabricated structural modules (1). The system (10) may collect methane from the ground beneath and/or be fed with methane collected from beneath a building (19) adjacent the system.

25 Claims, 2 Drawing Sheets

METHANE VENTING SYSTEM

CROSS-REFERENCE TO RELATED APPLICATIONS

The present application is a national stage application of International Patent Application No. PCT/GB2009/002566, filed Oct. 28, 2009, which claims priority to Great Britain Application No. 0819778.2 filed Oct. 28, 2008, the contents of both of which are incorporated by reference herein in their entirety.

This invention relates to a venting system for subsoil methane, particularly but not exclusively from the ground below developments such as buildings.

Passive gas venting is a well established method of dealing with emissions of gases such as methane and carbon dioxide from the ground below developments. It is used to provide ventilation below building floor slabs and as a means of venting gas from the ground around the perimeter of a site to prevent migration off site. In WO0220186, for example, there is disclosed apparatus suitable for venting and dispensing gas from an area of ground. The apparatus comprises a passage surrounding the area of ground, being located in the ground and extending generally horizontally. The passage is formed from a plurality of self-supporting open units and has an impermeable outer skin. Columns extends downwardly, being formed of a core material having an open permeable structure. The columns have a fluid permeable exterior, and are in communication with the interior of the passage. Air is admitted into the passage, mixes with any gas that has been collected by the columns, and then passes out of the passage through a vent.

In current passive venting systems methane and any other gases such as carbon dioxide are simply diluted with fresh air and allowed to vent to the atmosphere, as in WO 0220186. The dilution prevents methane from reaching explosive concentrations, but the total volume of methane that is released is not reduced.

Methane is a green house gas and its effects on the global climate are far more severe than carbon dioxide. Thus venting the gas is not ideal and it would be better to convert it to a less damaging gas before allowing it to vent.

Biofiltration has been used to treat landfill gas. A biofilter such as compost spread over the surface of a landfill site will treat methane and biodegrade it by oxidation to carbon dioxide and water. However, such a system is inappropriate for use beneath a development.

EP 0884117 discloses a system for landfill venting in which gas escaping from landfill waste is collected under landfill covering and discharged to the atmosphere through an upwardly extending venting conduit in which is provided a container of biofilter material.

Viewed from one aspect, the present invention provides a structure for disposing of methane beneath the ground, comprising:
(i) a subsoil biofilter layer which receives methane, the biofilter layer containing biofilter material for converting the methane to carbon dioxide and water, and comprising structural portions which prevent crushing of the biofilter material and are pervious to gas to permit gas to pass into and out of the biofilter layer;
(ii) a subsoil ventilation layer above the biofilter layer, into which the carbon dioxide from the biofilter layer passes and is diluted with air, the ventilation layer comprising structural portions which define a ventilation space and are pervious to gas to permit gas to pass into the ventilation space from the biofilter layer; and
(iii) a vent communicating with the ventilation space so that the diluted carbon dioxide is vented to the atmosphere.

The biofilter layer may comprise compost, wood fibres or any other material that will lead to methane being oxidised to carbon dioxide and water.

There may be a civil engineering structure above ground, over the biofilter and ventilating layers. For example, such a structure could be a building although there may be other structures such as site barriers or paved areas where it is necessary to dispose of methane from beneath the structure. The sub-soil structure may be below a largely open space such as a paved area, car park or the like, or even a park or garden.

The biofilter layer is preferably provided at a shallow depth beneath the surface, and for example between about 0.15 to 5 m deep.

The construction above the ventilation layer is preferably such that the diluted carbon dioxide cannot pass directly from the ventilation layer but must flow to the vent. There could be an impermeable membrane, concrete, paving blocks or slabs, and so forth above the ventilating layer, to ensure that the methane is collected and distributed to the vent rather than, for example, leaking into a building or seeping through a paved area at unwanted places.

The vent may be situated remote from a building or other civil engineering structure. There may be a plurality of vents. The or each vent may comprise a conduit extending upwardly from ground level to an appropriate height, and terminating in an opening.

In some embodiments, there is a distribution layer beneath the biofilter layer, into which methane is channelled, so that the methane is distributed over the biofilter layer rather than concentrated at a particular zone or zones. The distribution layer may comprise structural portions which define a distribution space and are pervious to gas to permit gas to pass into the distribution space and to pass from the distribution space to the biofilter layer.

To facilitate collection of methane from the ground beneath the distribution layer, there may be collection and distribution paths extending downwards from the distribution layer into the ground beneath. These may comprise hollow structural modules, geocomposite structures or the like.

Whilst the subsoil structure for collecting and treating methane may be positioned directly beneath a building or other civil engineering structure, in some embodiments it may be displaced laterally from the building, for example being an area such as an open space, car park or the like adjacent the building. In such an arrangement, there may be a collection layer beneath the building. The collection layer may comprise structural portions which define a collection space and are pervious to gas to permit gas to pass into the collection space and to pass from the collection space to the biofilter layer, via the distribution layer if one is provided. There will be provided means to channel methane from below the building to the biofilter layer or the distribution layer, such as ground collection blankets, pipes, geocomposite strips or other suitable structures. There should be gas impermeable means above the collection layer to prevent methane passing into the building or the like, and also above the channelling means to prevent methane escaping directly without being treated.

In accordance with the various aspects of the invention, the biofilter layer, the ventilation layer and, where used, the distribution layer need to support the weight from above. In the case of a car park, for example, the weight of the anticipated number of cars needs to be taken into account. On the other hand, the layers need to permit a good flow of gas. The biofilter layer needs to be able to constrain the biofilter material such as compost and prevent it being compressed by the loads from above. In preferred embodiments, at least the biofilter layer uses high strength prefabricated units which have upwardly extending portions to resist compression and have apertured walls to permit gas flow. In WO 02/14608, there is disclosed a structural module intended primarily for use in the construction of a sub-base layer, in place of traditional particulate materials such as natural aggregate. The preferred module is cuboid in form, and may for example be moulded from strong plastics although it could be fabricated from any suitable material. The module is intended for use in water handling such as drainage, and the walls of the module are apertured to allow fluid flow to both vertically and horizontally through the module.

In a preferred arrangement described and illustrated in WO 02/14608, each module is formed from a top half which includes a top wall and the upper part of a peripheral sidewall, and a bottom half defining a bottom wall and the lower part of the peripheral sidewall. The top and bottom halves may each be provided with a set of half-pillars extending towards one another, the two sets of half-pillars cooperating with one another to form pillars extending between the top and bottom walls to resist vertical and lateral crushing of the module. The top and bottom halves may be two integral plastics moulded components which are fitted one inverted on top of the other. Preferably, the module further comprises a network of bracing members extending between the pillars within the module to resist deformation of the module in a horizontal plane.

In an embodiment of the present invention, modules as disclosed in WO 02/14608, or other prefabricated modules of a similar type, can be filled with a biofilter material such as compost and used to form the biofilter layer. The modules are arranged in a horizontally extending array, and there may be two or more layers of modules in the array. Typically, the depth of the biofilter layer may be in the range of about 500 mm to about 750 mm, but the depth will depend on a number of factors including the intended gas flow.

In a preferred arrangement, the ventilation layer and/or the distribution layer also use high strength prefabricated units which have upwardly extending portions to resist compression and have apertured walls to permit gas flow. The ventilation layer and/or the distribution layer may be formed from one or more layers of the modules described above, in this case without the biofilter material inside. There are other possibilities for distributing the methane over the base of the biofilter layer, such as the use of a mat of geocomposite material. Where means are provide to improve the collection of methane from beneath the ground, for transfer into the treating structure, columns of the structural modules could be used.

A collection layer below a building or other may be achieved by using, for example, high strength modules as discussed above, or a methane collection blanket of geotextile material, or for example an array of slotted pipes. Where there is an existing building with a system for venting methane to atmosphere from beneath the building, instead of the methane being channelled to an existing vent, it can be diverted to a subsoil area as discussed above, for conversion to carbon dioxide, dilution, and then venting.

Thus, in some embodiments of the invention the structural portions of the biofilter layer are provided by a horizontal array of prefabricated units which have upwardly extending portions to resist compression and have apertured walls to permit gas flow, the walls of each prefabricated unit defining an interior which contains the biofilter material.

In some embodiments of the invention the structural portions of the ventilation layer are provided by a horizontal array of prefabricated units which have upwardly extending portions to resist compression and have apertured walls to permit gas flow, the walls of each prefabricated unit defining an interior which defines part of the ventilation space.

In some embodiments of the invention, the structural portions of the distribution layer are provided by a horizontal array of prefabricated units which have upwardly extending portions to resist compression and have apertured walls to permit gas flow, the walls of each prefabricated unit defining an interior which defines part of the distribution space.

In some embodiments of the invention, the collection paths are defined by a vertical array of prefabricated units which have upwardly extending portions to resist compression and have apertured walls to permit gas flow, the walls of each prefabricated unit defining an interior which defines part of a collection path.

It will be appreciated that the invention makes use of a large subsoil area, below for example a building, paved region, car park or the like. There can thus be a large volume of biofilter material to treat the methane, which can be gathered from a large area, without the structure being obtrusive.

The invention can be used to dispose of methane from any region below ground. In some embodiments of the invention, the subsoil layers are beneath an open area. In some embodiments of the invention, the open area is adjacent a building, there being a gas collection system beneath the building and a path for feeding collected methane from beneath the building laterally to the structure. In some embodiments of the invention, the subsoil layers are beneath a building. In either case, viewed from another aspect the invention provides a building provided with a structure as described above.

Viewed from another aspect the present invention provides a method of disposing of methane from beneath the ground, using a structure as described above.

In embodiments of the various aspects of the invention, means should be provided to admit air into the ventilation layer, to mix with the carbon dioxide and create a flow sufficient to pass out of the vent. The air flow can be driven passively, using for example wind pressure and temperature effects, or active using for example fans or pumps. In the case of there being a collection layer beneath a building or other civil engineering structure, form which methane is distributed laterally to a treating structure, there may be a flow of air to cause a suitable flow, the air being passed into and through the collection layer, and a connection to the treating area, passively or actively as described above.

Some embodiments of the invention will now be described by way of example and with reference to the accompanying drawings, in which.

Figure 1:
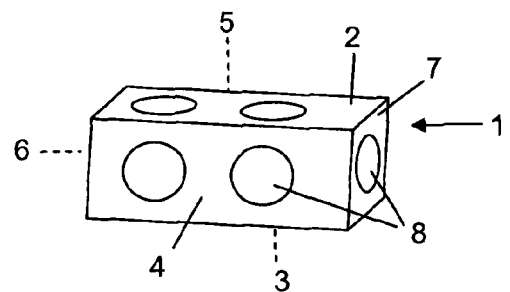
FIG. 1 is a diagrammatic view of a structural module in embodiments of the invention.
Figure 2:
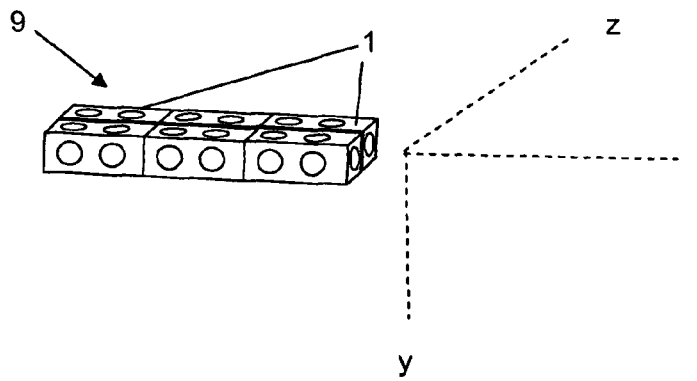
FIG. 2 is a diagrammatic view of how the modules can be arranged in an array.

Referring now to FIG. 1, there is shown a structural module 1 of strong moulded plastics material. It is in the form of a hollow crate with a top 2, bottom 3, sides 4 and 5 and ends 6 and 7. All six faces are provided with apertures 8. The module is represented diagrammatically only, and in practice the module may be as described in WO 02/14608 and available from Permavoid™ Limited. FIG. 2 shows how an array 9 of the modules can be constructed with the modules arranged adjacent each other in the x, y and z directions, i.e. both horizontally and vertically. such arrays are used to construct the functional layers of an arrangement in accordance with the invention, in the described embodiments. Other modules, whether prefabricated or constructed on site from materials could be used instead, as well as other structures capable of defining the layers.

Figure 3:
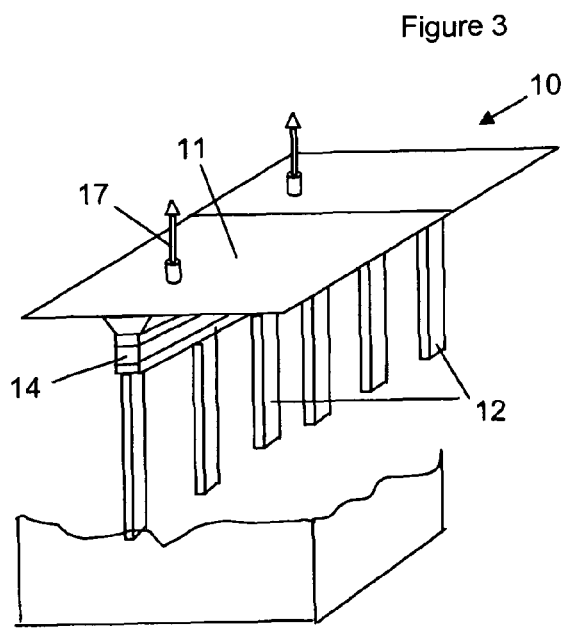
FIG. 3 is a view of an in-ground system.

FIG. 3 shows and arrangement 10 for disposing of methane from below, for example an area 11 such as a car park. Collection nodes 12 project downwardly into the ground, to enhance the upward passage of methane. The nodes connect with a laterally extending, lower distribution layer 13, beneath a laterally extending biofilter layer 14 and a laterally extending upper ventilation layer 15, all of which are subsoil layers below the surface 16 of the area 11. The ventilation layer 15 communicates with vents 17, one of which can serve as an inlet for air into the ventilation layer, and the other as an outlet for the air/carbon dioxide mix. The arrangement is shown more clearly in FIGS. 4 and 5. Each of the distribution, biofilter and ventilation layers is made from a horizontally extending array of modules 1. In the biofilter layer, the modules 1 are filled with a biofilter material 18 such as compost. The collection nodes 12 may also be constructed from modules 1 but may have other constructions also.

In use, methane collected by the collection nodes and passing upwardly through the ground passes into the distribution layer (13), where it is distributed around the layer and then passes into the biofilter layer. The biofilter material such as compost reacts with the methane to create water and carbon dioxide. The carbon dioxides passes into the ventilation layer, where it is diluted by air flowing through the ventilation layer from one of the vents, and then passes out to the atmosphere through the other of the vents.

Figure 4:
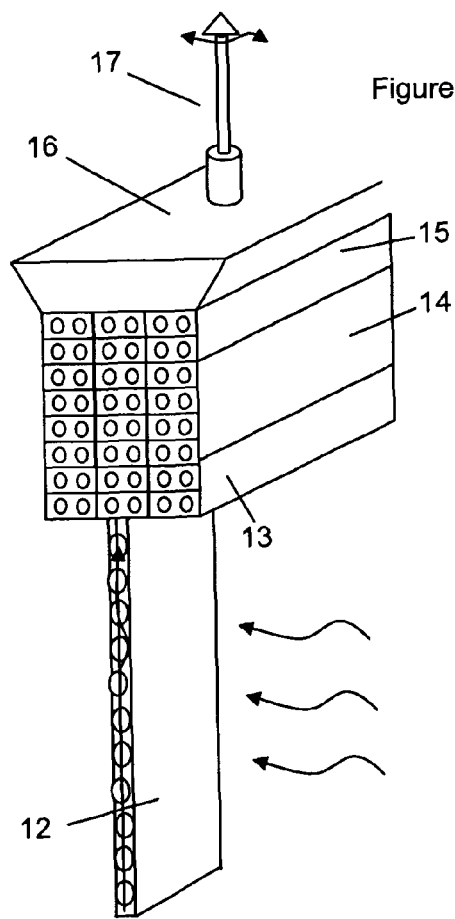
FIG. 4 is a detailed view of part of the system of FIG. 3.
Figure 5:
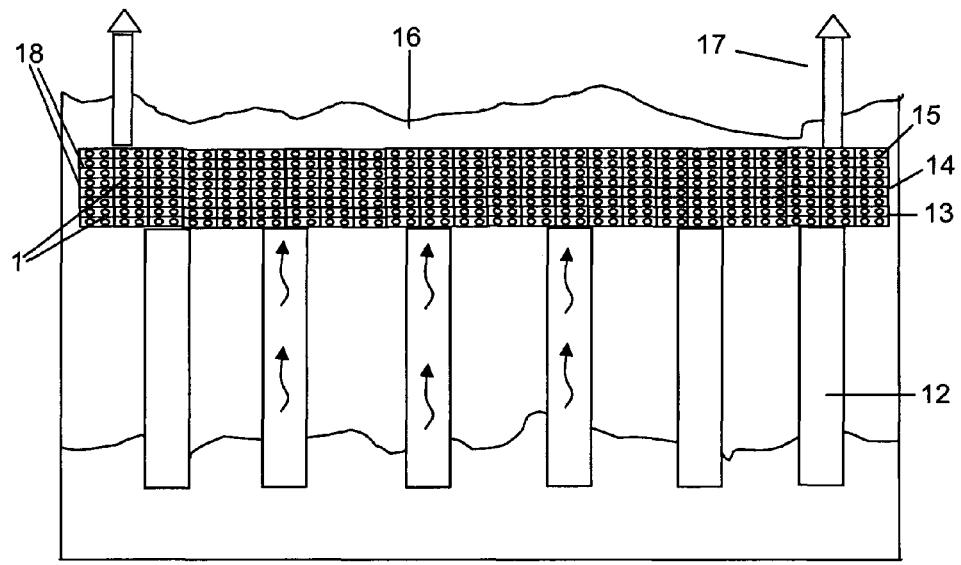
FIG. 5 is a side view of the system of FIG. 3.
Figure 6:
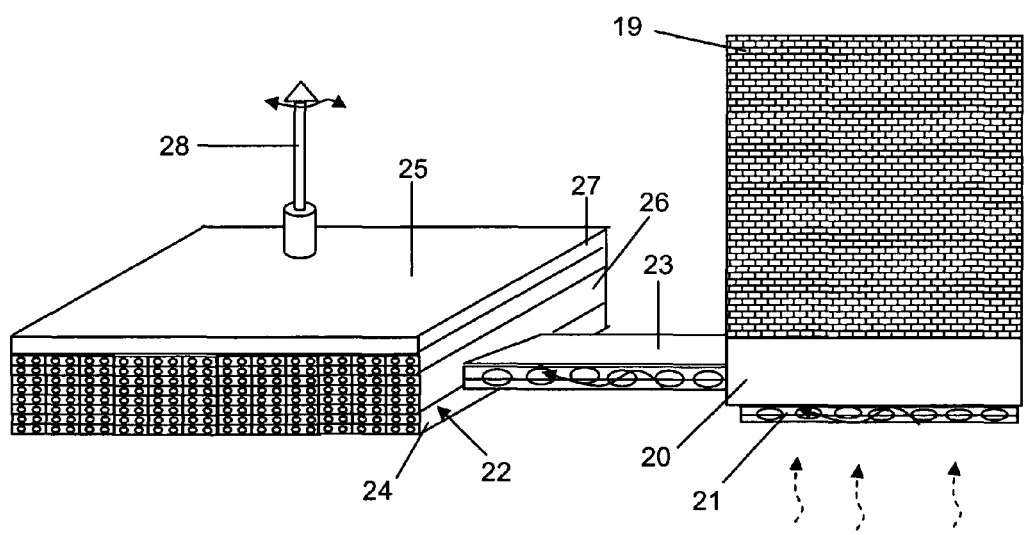
FIG. 6 is a system used in conjunction with a building.

FIG. 6 shows a system from removing and treating methane from below a building 19. Beneath the floor slab 20 of the building is an underfloor gas venting system comprising for example a collection blanket 21. Methane is collected and transmitted to a methane treating structure 22 by means of pipes or geocomposite strips 23 which communicate with a distributing layer 24. There may also be provided collection nodes beneath the distributing layer, as shown in FIGS. 3, 4 and 5. The methane treating structure 22 is located at a shallow depth beneath a paved area 25 such as a car park adjacent the building 19. As in the previous embodiment, above the distributing layer 24 is a biofilter layer 26, and above that a ventilating layer 27, where the carbon dioxide is diluted with air and passed to a vent 28 above ground. The distributing layer, biofilter layer and ventilation layer are all constructed from arrays of modules 1. In the biofilter layer 26, the modules contain suitable biofilter material such as compost which converts the methane into carbon dioxide and water.

It will be appreciated that the systems in accordance with the invention will also vent other gases from beneath ground. Other treating materials, filters and so forth may be provided in the modules as desired. The modules 1 ensure that flow passages are kept open and that contained materials such as the compost are not crushed. Keeping the compost in a relatively open form, rather than compressed into a small space, improves gas flow and increases the surface area of the material available to react with the methane.

The modules will also serve as drainage passages for water, whether generated by the reaction with methane or, for example, draining through from the surface.

It will thus be seen that the described embodiments of the invention provide a subsoil methane collection and treatment system (10), which includes a subsoil distribution layer (13) for receiving methane, a subsoil biofilter layer (14) above the distribution layer which contains a biofilter (18) such as compost to convert the methane to carbon dioxide and water, a subsoil ventilation layer (15) above the biofilter layer, in which the carbon dioxide is diluted with air, and a vent (17) to the atmosphere from the ventilation area for venting the diluted carbon dioxide. The layers may be defined by horizontal arrays of load bearing structural modules (1). The system (10) may collect methane from the ground beneath and/or be fed with methane collected from beneath a building (19) adjacent the system.

Embodiments of the invention provide a method of disposing of methane from beneath the ground, in which there is provided:
(i) a subsoil biofilter layer which receives methane, the biofilter layer containing biofilter material for converting the methane to carbon dioxide and water, and comprising structural portions which prevent crushing of the biofilter material and are pervious to gas to permit gas to pass into and out of the biofilter layer;
(ii) a subsoil ventilation layer above the biofilter layer, into which the carbon dioxide from the biofilter layer passes and is diluted with air, the ventilation layer comprising structural portions which define a ventilation space and are pervious to gas to permit gas to pass into the ventilation space from the biofilter layer; and
(iii) a vent communicating with the ventilation space so that the diluted carbon dioxide is vented to the atmosphere.

Embodiments of the invention provide a building having a methane collection and treatment system, comprising a methane collection arrangement underneath the building, and a path for feeding collected methane to pass to a methane treating structure beneath an area laterally adjacent the building, wherein the methane treating structure comprises:
(i) a subsoil biofilter layer biofilter layer, the biofilter layer containing biofilter material for converting the methane to carbon dioxide and water, and comprising structural portions which prevent crushing of the biofilter material and are pervious to gas to permit gas to pass into and out of the biofilter layer;
(ii) a subsoil ventilation layer above the biofilter layer, into which the carbon dioxide from the biofilter layer passes and is diluted with air, the ventilation layer comprising structural portions which define a ventilation space and are pervious to gas to permit gas to pass into the ventilation space from the biofilter layer;
(iii) a vent communicating with the ventilation space so that the diluted carbon dioxide is vented to the atmosphere; and
(iv) a subsoil distribution layer beneath the biofilter layer, for receiving methane fed from the methane collection arrangement underneath the building and distributing it to the biofilter layer.

Embodiments of the invention provide a methane collection, treatment and distribution system, which includes a subsoil distribution layer for receiving methane, a subsoil biofilter layer above the distribution layer which contains a biofilter to convert the methane to carbon dioxide and water, a subsoil ventilation layer above the biofilter layer, in which the carbon dioxide is diluted with air, and a vent to the atmosphere from the ventilation area for venting the diluted carbon dioxide.

Embodiments of the invention provide a method of disposing of subsoil methane, in which a subsoil distribution layer receives subsoil methane, a subsoil biofilter layer above the distribution layer contains a biofilter which converts the methane to carbon dioxide and water, a subsoil ventilation layer above the biofilter layer is used so that the carbon dioxide is diluted with air, and a vent to the atmosphere from the ventilation layer is used for venting the diluted carbon dioxide.

The detailed construction of the subsoil layers may be as discussed earlier. The methane may be provided to the distribution layer from the ground beneath the layer, for example using vertically extending vent nodes in the ground below, or may be provided from a collection system underneath a nearby civil engineering structure such as a building as discussed earlier.

These and other features provided by the embodiments of the invention are new and inventive.

The invention claimed is:

1. A structure for disposing of methane beneath the ground, comprising:
   (i) a subsoil biofilter layer which receives methane, the biofilter layer containing biofilter material for converting the methane to carbon dioxide and water, and comprising structural portions which prevent crushing of the biofilter material and are pervious to gas to permit gas to pass into and out of the biofilter layer, wherein the structural portions of the biofilter layer are provided by a first horizontal array of prefabricated units which have upwardly extending portions to resist compression and have apertured walls to permit gas flow, the walls of each prefabricated unit defining an interior which contains the biofilter material;
   (ii) a subsoil ventilation layer above the biofilter layer, into which the carbon dioxide from the biofilter layer passes and is diluted with air, the ventilation layer comprising structural portions which define a ventilation space and are pervious to gas to permit gas to pass into the ventilation space from the biofilter layer, wherein the structural portions of the ventilation layer are provided by a second horizontal array of prefabricated units which have upwardly extending portions to resist compression and have apertured walls to permit gas flow, the walls of each prefabricated unit defining an interior which defines part of the ventilation space; and
   (iii) a first vent communicating with the ventilation space to vent the diluted carbon dioxide to the atmosphere.

2. A structure as claimed in claim 1, wherein there is provided a subsoil distribution layer beneath the biofilter layer, for receiving methane and distributing it to the biofilter layer.

3. A structure as claimed in claim 2, wherein the distribution layer comprises structural portions which define a distribution space and are pervious to gas to permit gas to pass into the distribution space and to pass from the distribution space to the biofilter layer.

4. A structure as claimed in claim 3, wherein the structural portions of the distribution layer are provided by a third horizontal array of prefabricated units which have upwardly extending portions to resist compression and have apertured walls to permit gas flow, the walls of each prefabricated unit defining an interior which defines part of the distribution space.

5. A structure as claimed in claim 4, wherein there are collection paths extending downwardly from the distribution layer into the ground beneath.

6. A structure as claimed in claim 5, wherein the collection paths are defined by a vertical array of prefabricated units which have upwardly extending portions to resist compression and have apertured walls to permit gas flow, the walls of each prefabricated unit defining an interior which defines part of a collection path.

7. A structure as claimed in claim 5, wherein the collection paths are defined by a geocomposite structure.

8. A structure as claimed in claim 1, wherein the subsoil layers are beneath an open area.

9. A structure as claimed in claim 8, wherein the open area is adjacent a building, there being a gas collection system beneath the building and a path for feeding collected methane from beneath the building laterally to the structure.

10. A structure as claimed in claim 1, wherein the subsoil layers are beneath a building.

11. A structure as claimed in claim 1, wherein above the ventilation layer there is provided a gas-impermeable layer, and a first conduit communicates the ventilation layer with the first vent.

12. A structure as claimed in claim 1, wherein there is provided a second vent communicating with the ventilation space to admit fresh air to the ventilation space.

13. A structure as claimed in claim 12, wherein above the ventilation layer there is provided a gas-impermeable layer, a first conduit communicates the ventilation layer with the first vent, and a second conduit passes communicates the ventilation layer with the second vent.

14. A structure for disposing of methane from beneath a building, comprising:
   (i) a methane collection area underneath the building for collecting methane from beneath the building;
   (ii) a subsoil methane treatment area displaced laterally from the building; and
   (iii) a first conduit for feeding methane from the methane collection area to the methane treatment area; wherein the methane treatment area comprises:
   (iv) a subsoil biofilter layer containing biofilter material for converting the methane to carbon dioxide and water, the biofilter layer comprising structural portions which prevent crushing of the biofilter material and are pervious to gas to permit gas to pass into and out of the biofilter layer, and the biofilter area being in communication with the first conduit;
   (v) a subsoil ventilation layer above the biofilter layer, into which carbon dioxide from the biofilter layer passes and is diluted with air, the ventilation layer comprising structural portions which define a ventilation space and are pervious to gas to permit gas to pass into the ventilation space from the biofilter layer; and
   (vi) a first vent communicating with the ventilation space by means of a second conduit, for venting diluted carbon dioxide to the atmosphere.

15. A structure as claimed in claim 14, wherein there is provided a second vent communicating with the ventilation space by means of a third conduit, for admitting fresh air from the atmosphere into the ventilation space.

16. A structure as claimed in claim 14, wherein the biofilter layer is in communication with the first conduit by means of a subsoil distribution layer beneath the biofilter layer, into which the first conduit feeds.

17. A structure as claimed in claim 14, wherein:
   (i) the structural portions of the biofilter layer are provided by a first horizontal array of prefabricated units which have upwardly extending portions to resist compression and have apertured walls to permit gas flow, the walls of each prefabricated unit defining an interior which contains the biofilter material; and
   (ii) the structural portions of the ventilation layer are provided by a second horizontal array of prefabricated units which have upwardly extending portions to resist compression and have apertured walls to permit gas flow, the walls of each prefabricated unit defining an interior which defines part of the ventilation space.

18. A structure as claimed in claim 17, wherein the biofilter layer is in communication with the first conduit by means of a subsoil distribution layer beneath the biofilter layer, into which the first conduit feeds; the distribution layer comprises structural portions which define a distribution space and are pervious to gas to permit gas to pass into the distribution space and to pass from the distribution space to the biofilter layer; and the structural portions of the distribution layer are provided by a third horizontal array of prefabricated units which have upwardly extending portions to resist compression and have apertured walls to permit gas flow, the walls of each prefabricated unit defining an interior which defines part of the distribution space.

19. A structure as claimed in claim 18, wherein the distribution layer is provided with collection paths extending downwardly from the distribution layer into the ground beneath.

20. A structure as claimed in claim 19, wherein the collection paths are defined by a vertical array of prefabricated units which have upwardly extending portions to resist compression and have apertured walls to permit gas flow, the walls of each prefabricated unit defining an interior which defines part of a collection path.

21. A structure as claimed in claim 19, wherein the collection paths are defined by a geocomposite structure.

22. A structure as claimed in claim 14, wherein the methane collection area underneath the building comprises a geotextile blanket.

23. A structure as claimed in claim 14, wherein the methane collection area underneath the building comprises a horizontal array of prefabricated units which have upwardly extending portions to resist compression and have apertured walls to permit gas flow, the walls of each prefabricated unit defining an interior which defines part of the methane collection area.

24. A structure for collecting and treating subsoil methane, comprising a horizontally extending subsoil distribution layer which collects methane from beneath the structure; a horizontally extending subsoil biofilter layer disposed above the distribution layer, and to which the distribution layer distributes collected methane, the biofilter layer comprising biofilter material which converts methane to carbon dioxide and water; a horizontally extending subsoil ventilation layer disposed above the biofilter layer, which receives gas from the biofilter layer and in which the gas is diluted with air; a gas impermeable layer above the ventilation layer; and a conduit passing from the ventilation layer, through the gas impermeable layer to an opening to atmosphere, to vent diluted gas.

25. A structure as claimed in claim 24, wherein a second conduit passes from a seconding opening to atmosphere, through the gas impermeable layer and to the ventilation layer, to admit fresh air into the ventilation layer.

* * * * *